June 7, 1960  C. CASTELLI ET AL  2,939,610
DISPENSING DEVICE
Filed Oct. 3, 1957
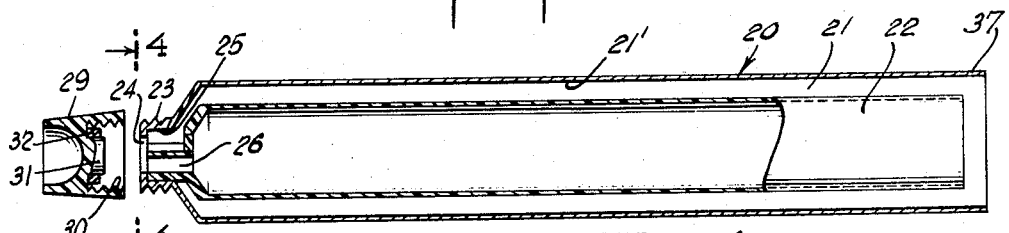
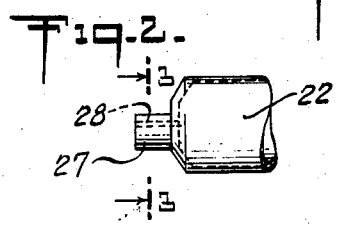
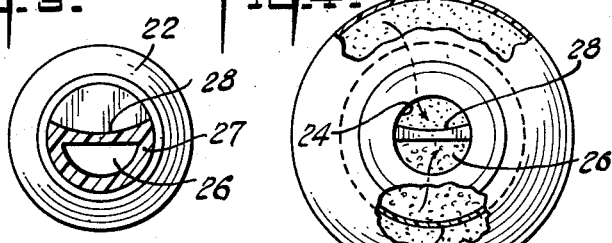
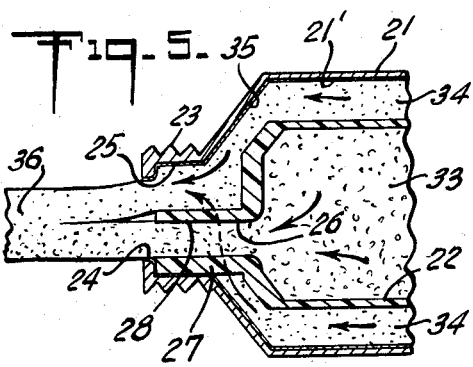
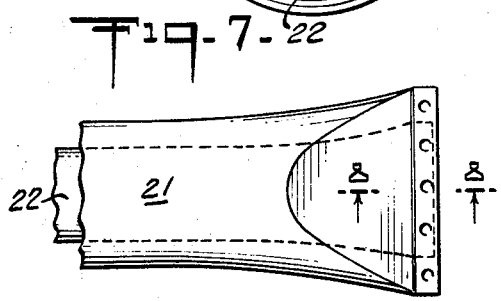
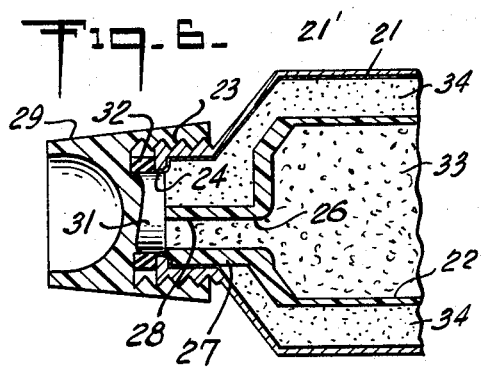
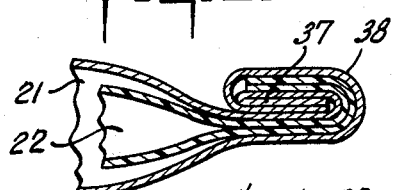
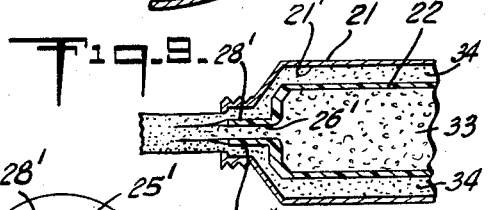
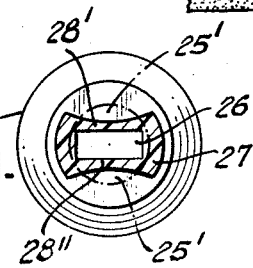

United States Patent Office 2,939,610
Patented June 7, 1960

2,939,610

DISPENSING DEVICE

Charles Castelli, New Brunswick, N.J., and Charles E. Moser, Ambler, and William H. Ashton, Philadelphia, Pa., assignors to Johnson & Johnson, a corporation of New Jersey Filed Oct. 3, 1957, Ser. No. 688,027

7 Claims. (Cl. 222—94)

This invention relates to dispensing devices adapted to provide an integrated stream of viscous material made up of at least two sub-streams which are integrated into the main stream in such a manner that there is at least one sharp demarcation between the sub-streams at the outer surface of the main stream. More particularly, the invention relates to a multi-cameral container of the collapsible tube type having a separate inner tube set within an outer tube, both tubes having separate juxtaposed discharge means to give the desired integrated stream; e.g., of two pasty materials of different colors, or of pastry decorating materials such as cake decorations, or of food spreads, such as cheese and a fish or a meat paste.

Various proposals have been made heretofore of multicameral containers including some of the collapsible tube type having a separate inner tube in an outer tube. As far as is known, these have not achieved substantial commercial success, and they suffer from numerous drawbacks, including economic drawbacks. The art is confronted by the problem of providing efficient multicameral dispensers which can deliver an integrated stream of various desired configurations, especially with sharp demarcation lines between various sub-streams, and at a sufficiently low cost to be economically attractive.

The discoveries associated with the invention and relating to solutions of the above problems, and the objects achieved in accordance with the invention as set forth herein include: the provision of a multicameral dispensing device having juxtaposed discharge means arranged to deliver an integrated stream made up of a multiplicity of different sub-streams and having at least one sharp demarcation between the sub-streams at the surface of the integrated stream; the provision of such a device in the form of a multicameral container having a first discharge part connected to a first container and having a terminal inner flange at its exit, and, a second discharge part connected to a second dispensing container juxtaposed in relation to the first discharge part, and means for simultaneously closing all of the discharge parts; the provision of such a device including an outer collapsible tube having therein an inner collapsible tube, the discharge part from the latter being adapted to provide a substantially hemicylindrical sub-stream and the discharge part from the outer tube being adapted to provide a sub-stream which is sufficiently hemi-cylindrical and also guided by the flange so as to integrate with the other sub-stream to form a single stream having a sharp demarcation at its surface between the sub-sections thereof provided by the two sub-streams; the provisions of such a multicameral collapsible tube wherein the cross section of the partition separating the two streams is narrowest at its mid-point and widens progressively toward each of its ends; the provision of such a container wherein the outer tube is made of aluminum metal and the inner tube is made of polyethylene plastic; the provision of such a collapsible tube container wherein the discharge part of the inner tube is adapted to provide a sub-stream corresponding in cross section to a rectangle or substantially to a longitudinal mid-section of a cylinder and the outer tube has two discharge parts, each giving a stream corresponding in form substantially to the side portion of a cylinder, both of the streams from the outer tube being directed to integrate with the stream from the inner tube to give an integrated stream having at its surface sharp demarcations between the various sub-sections thereof provided by the various substreams; the provision of such containers wherein the nozzles are arranged to deliver spiral streams and the integrated stream has one or more sharp spiral demarcations; and other objects which will be apparent as details or embodiments are set forth hereinafter, including the attached drawings wherein:

Figure 1 is a transverse longitudinal section, partly in elevation, of an unfilled bicameral collapsible tube assembly.

Figure 2 is a fragmental elevational view of the inner tube of Figure 1.

Figure 3 is a vertical cross sectional view taken along the lines 3—3 of Figure 2.

Figure 4 is an elevational view, partly broken away and partly in cross section as viewed along lines 4—4 of Figure 1.

Figure 5 is a fragmentary cross sectional view of the left hand portion of Figure 1 on an enlarged scale.

Figure 6 is a fragmentary cross sectional view of the left hand portion of Figure 1 showing the closure cap in place.

Figure 7 is an elevational view, partly broken away of the permanently sealed end of the tube.

Figure 8 is an enlarged cross sectional view taken along lines 8—8 of Figure 7.

Figure 9 is a fragmentary cross sectional view of the left hand portion on a somewhat enlarged scale of an alternative modification of the structure of Figure 1.

Figure 10 is a vertical cross sectional view of the nozzle assembly of Figure 9.

In order to facilitate a clear understanding of the invention, the following preferred specific embodiments are described in detail.

*Example 1*

Referring to Figures 1 through 8 of the drawing, the tube assembly 20 (before filling) is made up of an outer tube 21 which may be made of aluminum or the like material and may include an epoxy resin or the like inert coating 21′ if desired, an inner tube 22 which may be made of polyethylene plastic or the like, a threaded end portion 23 of the outer tube, an aperture 24 of the outer tube, an inner flange 24a, a sub-aperture 25 in the outer tube, an aperture 26 of the inner tube including a neck 27 and a partition or wall 28, a cap or common closure means 29 including threads 30, a boss 31 and if desired a gasket 32. If the cap is made of polyethylene, no separate gasket is needed. The assembly also includes a passageway between the two tubes 35, and an extension 37 of the outer tube beyond the inner tube. In use, the inner tube contents 33 and the outer tube contents 34 (separated by the partition or wall 28) are merged into the single stream 36. The permanent closure or folded end of the tube assembly 38 may be made by flattening the ends of the tubes and then folding the extension 37 of the outer tube, and following this with two more folds of both tubes. Alternatively, the second fold may be twice the length of the first fold followed by a reverse fold of one-half its length, as known in the art.

This tube delivers two sub-streams of viscous material integrated into a single stream of substantially cylindrical cross section, for instance, if a red colored paste is charged into the outer tube and a white paste into the inner tube, the merged stream will be substantially one-half white and one-half red and there will be a sharp demarcation at the surface of the integrated stream. If the discharge part of the inner tube is made with a spiral twist, the integrated stream will have a spiral red and white pattern with the above indicated sharp demarcation.

In a preferred assembly substantially the actual size of the drawings, the outer tube orifice is ⁹⁄₃₂ in. in diameter and the corresponding bore (25) ⁷⁄₁₆ in. in diameter, the inner flange corresponds in radial depth to the average thickness of the partition 28. The inner tube neck 27 fits snugly into the bore 25, and occupies more than half of this bore so as to prevent its lateral movement therein. The paste charged into the inner chamber may be of a viscosity in the range of 150,000 to 200,000 cps. (centipoises, measured at 75° F. with a helical path, rotating stem viscometer, such as the so-called Brookfield viscometer), and that in the outer tube in the range of 125,000 to 150,000 cps. The linear extrusion rate may be about 1 to 2 in. per second.

This modification gives the desired integrated stream; whereas, if there is no inner flange, separate streams are formed. If the flange depth is excessive, undesirable mixing occurs giving a blurred pattern.

*Example 2*

This collapsible tube assembly is similar to that of Example 1 except that the inner tube has a single aperture 26' and two walls 28' and 28" connected by neck portions 27'. The outer tube has two apertures 25'. The neck fits snugly into the bore so that there is no relative lateral movement. If this device is charged with colored paste, as described in Example 1, the surface of the integrated stream will have a middle white pattern and two red side patterns with sharp demarcation between patterns.

If the discharge part of the inner tube is formed with a spiral twist, the resulting integrated stream will have a spiral pattern with the sharp demarcation.

Although the foregoing modifications are particularly advantageous from the economic viewpoint, other dispensing containers having the juxtaposed nozzle arrangements of the invention may be made, incorporating the principles of the present invention. Any convenient means for applying pressure to the viscous contents in order to extrude it through the orifices may be used.

Any viscous or pasty materials may be charged into the containers if desired, and, of course, the materials of construction should be such as to be inert or compatible with the contents.

Typical pastes may include a substantial amount of water, a so-called binding agent such as vegetable gum or a synthetic gum including Irish moss, carboxymethylcellulose, gum tragacanth, and starches. It may include humectants, including glycerine and various glycols, as well as preservatives, flavoring materials including saccharine, detergent materials including soap and so-called non-soap detergents, and coloring materials. For some purposes they may include a polishing agent such as various calcium salts, including carbonate, sulphate, or the phosphate.

In a collapsible tube type container, it is desirable that once the tube assembly is compressed and some of the contents are discharged, that the tube retain its new volume. In other words, there should be no tendency for the tube to expand and draw back air or partially extrude paste into the discharge opening. For this purpose, an outer metal tube arranged with an inner plastic tube is particularly desirable. The plastic tube may have a tendency to expand; however, the metal tube is of such construction as to counteract such tendency, so that the whole assembly will have sufficient physical stability to avoid the undesirable drawback.

The thickness of the inner flange should be sufficient to afford the desired rigidity. A preferred thickness is ¹⁄₃₂ in.; in which case the outermost portion of aperture 24 is ¹⁄₃₂ in. beyond the end of the partition 28, provided the end of this partition is at the inner side of the flange. On the other hand, the thickness of the flange should not be so great as to cause blurring or mixing of the sub-streams in the integrated stream.

Preferably, the end of the partition 28 is set up to or at the inner side of the flange. It may be set so that there is some distance between the two; however, this distance should not be so great as to cause blurring or mixing of the sub-streams in the integrated stream.

The tube assembly may be filled in any convenient manner; e.g., by charging the desired amount of paste in the outer tube (with cap on), inserting the inner tube (by means of a mandrel) and then charging the inner tube. Then the filled assembly is closed.

In view of the foregoing disclosures, variations or modifications thereof will be apparent, and it is intended to include within the invention all such variations and modifications except as do not come within the scope of the appended claims.

The claims are:

1. A multicameral container adapted for dispensing a multiplicity of viscous materials in a single integrated stream, in the surface of which stream there is at least one sharp demarcation between the various viscous materials, comprising a first dispensing container having a first discharge conduit having a terminal inner flange at its exit end, a second dispensing container having a second discharge conduit fixed in juxtaposition to the opening in the said first discharge conduit, a portion of said second discharge conduit forming a partition between said materials at said demarcation, the said inner flange being beyond the end of the partition, and common means for closing all of said discharge conduits.

2. A container of claim 1 wherein the first dispensing container is an outer collapsible tube and the second dispensing container is an inner collapsible tube, the second discharge conduit being adapted to provide a substantially hemi-cylindrical stream of dispensed viscous material, and the combination of the shape of the first discharge conduit and distance of the inner flange from the end of the partition being adapted to provide a stream of viscous material which is sufficiently hemi-cylindrical and guided so as to integrate with the stream from the inner tube to form a single stream having a sharp demarcation between the sub-sections thereof provided by the two viscous materials.

3. A container of claim 2 wherein the cross section of the partition is narrowest at its mid-point and widens progressively toward each of its ends.

4. A container of claim 3 wherein the outer tube is made of aluminum and the inner tube is made of a polyethylene plastic.

5. A container of claim 1 wherein the first dispensing container is an outer collapsible tube and the second dispensing container is an inner collapsible tube, the second discharge conduit being adapted to provide a stream of viscous material corresponding in shape substantially to the longitudinal mid-section of a cylinder, the outer tube having two discharge conduits, the said second discharge conduit being between the latter two discharge conduits, the combination of the shape of each of the latter discharge conduits and the distances of the inner flanges from the ends of the two partitions being adapted to provide two streams of viscous material therefrom, each being substantially in the form of a side portion of a cylinder, both of the streams from the outer tube being directed toward the stream of the inner tube so as to integrate therewith to form a single stream having a sharp demarcation between the sub-sections thereof provided by the two viscous materials.

6. A container of claim 5 wherein the cross section of each partition is narrowest at its mid-point and widens progressively toward each edge.

7. A container of claim 6 wherein the outer tube is made of aluminum and the inner tube is made of a polyethylene plastic.

References Cited in the file of this patent

UNITED STATES PATENTS

| | | |
|---|---|---|
| 1,639,699 | Hopkins | Aug. 23, 1927 |
| 1,699,532 | Hopkins | Jan. 22, 1929 |
| 1,894,115 | Murphy | Jan. 10, 1933 |

FOREIGN PATENTS

| | | |
|---|---|---|
| 655,134 | France | Dec. 8, 1928 |